(12) United States Patent  
Bnayahu et al.

(10) Patent No.: US 9,152,415 B2  
(45) Date of Patent: *Oct. 6, 2015

(54) ABSTRACTING BENEFIT RULES FROM COMPUTER CODE

(71) Applicant: International Business Machines Corporation, Armonk, NY (US)

(72) Inventors: Jonathan Bnayahu, Haifa (IL); Edward F Nazarko, Lebanon, NJ (US); Mordechai Nisenson, Haifa (IL); Yahalomit Simionovici, Moshav Kerem Maharal (IL)

(73) Assignee: International Business Machines Corporation, Armonk, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/889,352

(22) Filed: May 8, 2013

(65) Prior Publication Data

US 2013/0247002 A1    Sep. 19, 2013

Related U.S. Application Data

(63) Continuation of application No. 12/609,142, filed on Oct. 30, 2009, now Pat. No. 8,468,512.

(51) Int. Cl.
*G06F 9/44* (2006.01)
*G06F 9/45* (2006.01)
*G06F 9/445* (2006.01)
*G06F 9/455* (2006.01)

(52) U.S. Cl.
CPC *G06F 8/74* (2013.01); *G06F 8/433* (2013.01); *G06F 8/34* (2013.01); *G06F 9/45516* (2013.01)

(58) Field of Classification Search
CPC ............. G06F 8/433; G06F 8/74; G06F 8/34; G06F 9/45516

See application file for complete search history.

(56) References Cited

U.S. PATENT DOCUMENTS

| 7,287,016 | B2 | 10/2007 | Johnson et al. |
| 7,533,365 | B1 * | 5/2009 | Hogstrom et al. ............. 717/105 |
| 2002/0052856 | A1 * | 5/2002 | Satoh ................. 706/4 |
| 2003/0139954 | A1 * | 7/2003 | Chung et al. ...................... 705/7 |

(Continued)

OTHER PUBLICATIONS

Vahid Garousi, Control Flow Analysis of UML 2.0 Sequence Diagrams, 2005, pp. 25-51.*

(Continued)

*Primary Examiner* — Thuy Dao
*Assistant Examiner* — Mongbao Nguyen

(57) ABSTRACT

A method that includes: obtaining a computer code usable to process insurance claims; building a computer readable directed graph representing a control flow of the code and comprising nodes connected by edges, some of the nodes being decision nodes associated with decisions and some of the nodes being action nodes associated with actions; determining, on the graph, benefit action nodes that are each associated with at least one monetary outcome of a specified insurance claim; identifying all logic paths that lead to each benefit action node by traversing the graph from each benefit action node backwards, each logic path comprising a sequence of preceding decision nodes and action nodes connected by edges, each set of paths being associated with a specified benefit action node representing a benefit rule; and outputting all benefit rules by presenting each specified benefit action in relation to grouped logic paths associated with the specified benefit action.

18 Claims, 6 Drawing Sheets

(56) References Cited

U.S. PATENT DOCUMENTS

| | | |
|---|---|---|
| 2003/0158759 A1 | 8/2003 | Kanneenberg |
| 2004/0098710 A1* | 5/2004 | Radigan ............... 717/144 |
| 2006/0129956 A1* | 6/2006 | Ward ..................... 716/4 |
| 2006/0265699 A1* | 11/2006 | Ali et al. ............... 717/141 |
| 2007/0294663 A1* | 12/2007 | McGuire et al. ....... 717/108 |
| 2007/0294665 A1* | 12/2007 | Papakipos et al. ..... 717/119 |
| 2008/0066061 A1* | 3/2008 | Gellerich ............... 717/140 |
| 2008/0134159 A1* | 6/2008 | Guo et al. .............. 717/154 |
| 2008/0320440 A1* | 12/2008 | Meijer et al. ........... 717/108 |
| 2009/0064113 A1* | 3/2009 | Langman et al. ....... 717/148 |
| 2009/0112753 A1* | 4/2009 | Gupta et al. ........... 705/38 |
| 2009/0132314 A1* | 5/2009 | Franco .................. 705/7 |
| 2009/0138248 A1* | 5/2009 | Benayon et al. ....... 703/6 |
| 2009/0183141 A1* | 7/2009 | Tai et al. ............... 717/124 |
| 2009/0281999 A1* | 11/2009 | Sinha ..................... 707/3 |
| 2010/0083240 A1* | 4/2010 | Siman .................... 717/144 |
| 2010/0325412 A1* | 12/2010 | Norrman et al. ....... 713/100 |
| 2013/0291113 A1* | 10/2013 | Dewey ................... 726/25 |

OTHER PUBLICATIONS

Eric Van Wyk, Using Verified Data-Flow Analysis-based Optimizations in Attribute Grammars, 2006, pp. 1-12.*

R.M.Smelik, Specification and Construction of Control Flow Semantics, 2006, pp. 23-33, 57-69 and 79-88.*

Len Erlikh, "Leveraging Legacy System Dollars for E-Business", IEEE 2000.

Erik Putrycz, "Recovering Business Rules from Legacy Source Code for System Modernization", 2007.

* cited by examiner

| CODE | NATURAL LANGUAGE |
|---|---|
| ECH | Each |
| UUM | Unlimited Ultimate Maximum |
| PRT 197 | Global Maternity Medical Policy |
| AGE 6935 40150 | age is between 19 and 110 years |

FIG. 4

|  | In Network | Out of Network |
|---|---|---|
| 610 No Deductible, With Coinsurance | 612 | 614 |
| 620 No Deductible, No Coinsurance | 622 | 624 |
| 630 Maximums | 632 | |

ABSTRACTING BENEFIT RULES FROM
COMPUTER CODE

BACKGROUND

1. Technical Field

The present invention relates to the field of software code abstracting.

2. Discussion of the Related Art

Computerized systems configured for processing of insurance claims are known in the healthcare industry and property and casualty insurance companies. Computer codes implementing these systems usually include tens of millions of lines written in proprietary, obsolete languages that are hard to understand, maintain and reuse. Any modernization effort of such systems requires reverse engineering of the existing computer code into benefit rules. Today, such a process is typically done manually, making the overall modernization costly and inefficient.

BRIEF SUMMARY

One aspect of the invention provides a method comprising: obtaining a computer code usable to process insurance claims; building a computer readable directed graph representing a control flow of the code, by identifying decisions and actions in the code, the graph comprising nodes connected by edges, some of the nodes being decision nodes associated with the decisions and some of the nodes being action nodes associated with the actions; determining, on the graph, benefit action nodes that are each associated with at least one monetary outcome of a specified insurance claim; identifying all logic paths that lead to each benefit action node by traversing the graph from each benefit action node backwards, each logic path comprising a sequence of preceding decision nodes and action nodes connected by edges, each set of paths being associated with a specified benefit action node representing a benefit rule; and outputting all benefit rules by presenting each specified benefit action vis à vis grouped logic paths associated with the specified benefit action, wherein at least one of: the obtaining, the building, the determining, the identifying, and the outputting is performed by at least one computer.

Another aspect of the invention provides a system that includes: a computer-implemented backend module; and a computer-implemented graphical user interface module, wherein the backend module being configured to: obtain a computer code usable to process insurance claims; build a computer readable directed graph representing a control flow of the code, by identifying decisions and actions in the code, the graph comprising nodes connected by edges, some of the nodes being decision nodes associated with the decisions and some of the nodes being action nodes associated with the actions; determine, on the graph, benefit action nodes that are each associated with at least one monetary outcome of a specified insurance claim; and identify all logic paths that lead to each benefit action node by traversing the graph from each benefit action node backwards, each logic path comprising a sequence of preceding decision nodes and action nodes connected by edges, each set of paths being associated with a specified benefit action node representing a benefit rule, and wherein the graphical user interface module being configured to output all benefit rules by presenting each specified benefit action vis à vis grouped logic paths associated with the specified benefit action.

Yet another aspect of the invention provides a computer program product, the computer program product that includes: a computer readable storage medium having computer readable program embodied therewith, the computer readable program including: computer readable program configured to obtain a computer code usable to process insurance claims; computer readable program configured to build a computer readable directed graph representing a control flow of the code, by identifying decisions and actions in the code, the graph comprising nodes connected by edges, some of the nodes being decision nodes associated with the decisions and some of the nodes being action nodes associated with the actions; computer readable program configured to determine, on the graph, benefit action nodes that are each associated with at least one monetary outcome of a specified insurance claim; computer readable program configured to identify all logic paths that lead to each benefit action node by traversing the graph from each benefit action node backwards, each logic path comprising a sequence of preceding decision nodes and action nodes connected by edges, each set of paths being associated with a specified benefit action node representing a benefit rule; and computer readable program configured to output all benefit rules by presenting each specified benefit action vis à vis grouped logic paths associated with the specified benefit action.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 4 is a conversion table illustrating an aspect according to some embodiments of the invention;

FIG. 6 is a summary table diagram illustrating an aspect according to some embodiments of the invention.

Figure 1:
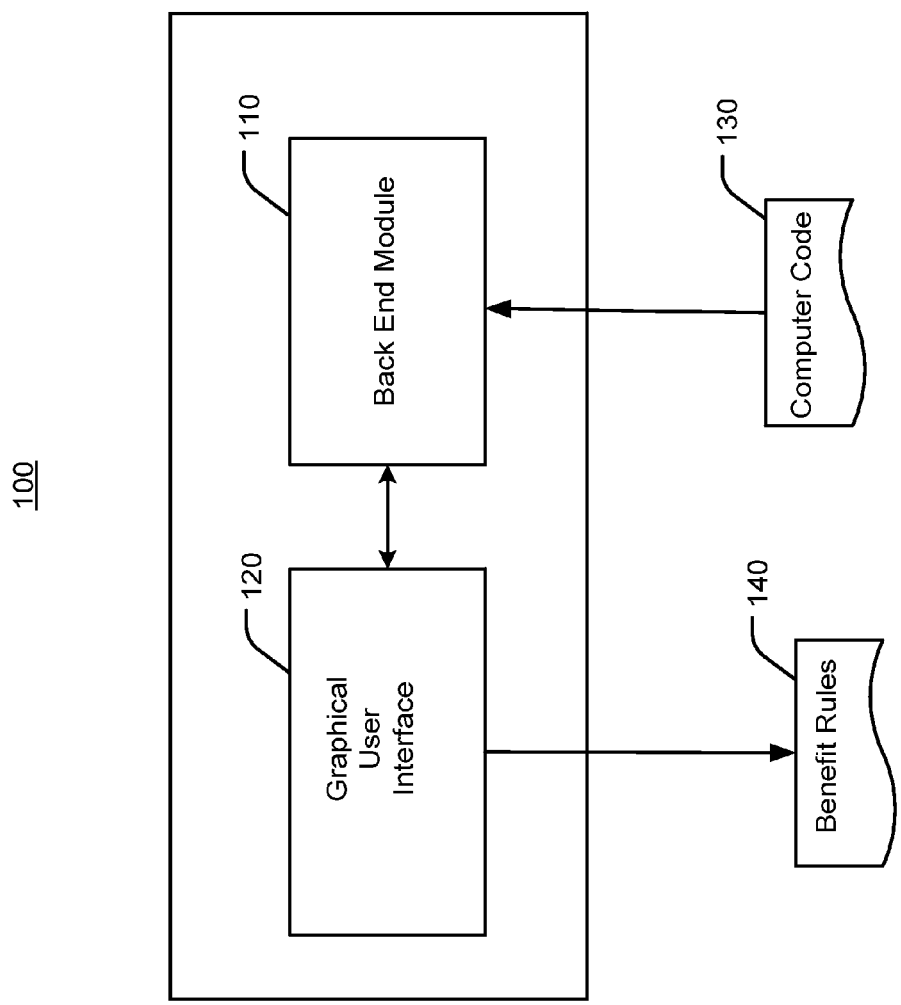
FIG. 1 is a high level schematic block diagram illustrating a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "insurance claim process" or "claim process" as used herein in this application refers to the life cycle of an insurance claim filed by an insurance policy holder and the following monetary consequences of his or her claim. Dedicated computerized systems are usually used to process such a claim The term "benefit rule" as used herein in this application, is broadly defined as any rule within an insurance policy that sets the circumstance in which a monetary effect take place.

The term "legacy code" as used herein in this application, refers to a source code that relates to a no-longer supported or manufactured operating system or other computer technology. The term can also mean code inserted into modern software for the purpose of maintaining an older or previously supported feature The term "graph" as used herein in this application refers to a mathematical structure used to model pair wise relations between objects from a certain collection. A "graph" in this context refers to a collection of vertices or 'nodes' and a collection of edges that connect pairs of vertices. A graph may be undirected, meaning that there is no distinction between the two vertices associated with each edge, or its edges may be directed from one vertex to another.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating a system according to some embodiments of the invention. The system 100 includes a computer-implemented backend module 110 and a computer-implemented graphical user interface module 120. System 100 is configured to obtain a computer code usable to process insurance claims 130 and output, in a human readable form, all benefit rules 140 implemented by the obtained computer code.

System 100 may be in the form of a computer that includes, in some embodiments, a processor (not shown) and a storage module (not shown). Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of nonvolatile memory, including by way of example semiconductor memory devices, such as EPROM, EEPROM, and flash memory devices and also magneto-optic storage devices.

Figure 2:
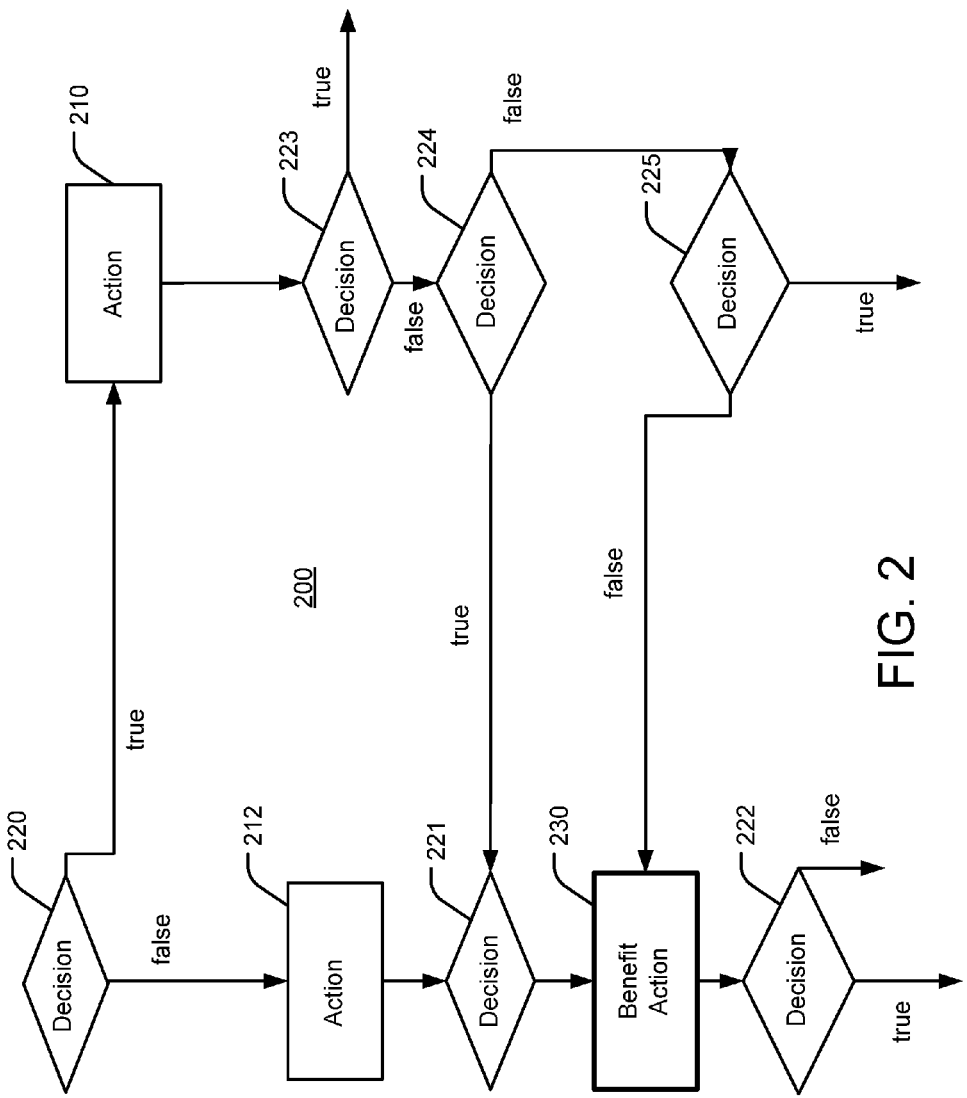
FIG. 2 is a graph diagram illustrating an aspect according to some embodiments of the invention.

FIG. 2 is a graph diagram illustrating an aspect according to some embodiments of the system depicted in FIG. 1. Backend module 110 of system 100 is configured to obtain a computer code usable to process insurance claims and build a computer readable directed graph such as 200. Directed graph 200 represents a control flow of the code, by identifying decisions and actions in the code. Directed graph 200 includes nodes connected by edges, some of the nodes being decision nodes 220-225 associated with the decisions and some of the nodes being action nodes 210, 212, and 230 associated with the actions. Backend module 110 is further configured to determine, from action nodes 210, 212, and 230 and on the graph, benefit action nodes (e.g., 230) that are each associated with at least one monetary outcome of a specified insurance claim and identify all logic paths that lead to each benefit action node (e.g., 230) by traversing graph 200 from each benefit action node backwards, each logic path comprising a sequence of preceding decision nodes and action nodes connected by edges, each set of paths being associated with a specified benefit action node representing a benefit rule. Such logic paths may be: 220>212>221>230, 220>210>223>224>221>230, or 220>210>223>224>225>221>230. In addition, graphical user interface module 120 is configured to output all benefit rules by presenting each specified benefit action vis à vis grouped logic paths associated with specified benefit action 230.

According to some embodiments of the invention, graphical user interface 120 is further configured to present the benefit rules such that each action and decision on each logic graph and each specified benefit action are presented in a specified natural language.

According to some embodiments of the invention, computer code 130 comprises commands, numeric codes, and conditions, wherein backend module 110 being further configured to convert the commands, the numeric codes, and the conditions into a specified natural language, and wherein graphical user interface module 120 is further configured to present the benefit rules in view of the converting such that each action and decision on each logic graph and each specified benefit action are presented in the specified natural language.

According to some embodiments of the invention, graphical user interface module 120 is further configured to present all the benefit rules 140 in a summary table format usable by insurance claim processing personnel.

According to some embodiments of the invention, graphical user interface module 120 is further configured to present a human-readable domain specific representation of the control flow of the computer code grouping benefit rules 140.

According to some embodiments of the invention, all decision nodes, such as 210, 212, 214 of a specified logic path affect the monetary outcome of the benefit action node associated with the logic path.

According to some embodiments of the invention, graphical user interface module 120 is further configured to visually indicate at least one specified location on the code associated with a specified benefit rule, responsive to a query regarding the specified benefit rule.

According to some embodiments of the invention, backend module 110 is further configured to automatically edit computer code 130 responsive to a specified revision to a specified benefit rule entered by a user over the graphical user interface, wherein backend module 110 is configured to convert the revision into a revised control flow, convert the revised control flow into a revised computer code portion, and replace the computer code portion associated with the benefit rule before the revision with the revised computer code portion.

Figure 3:
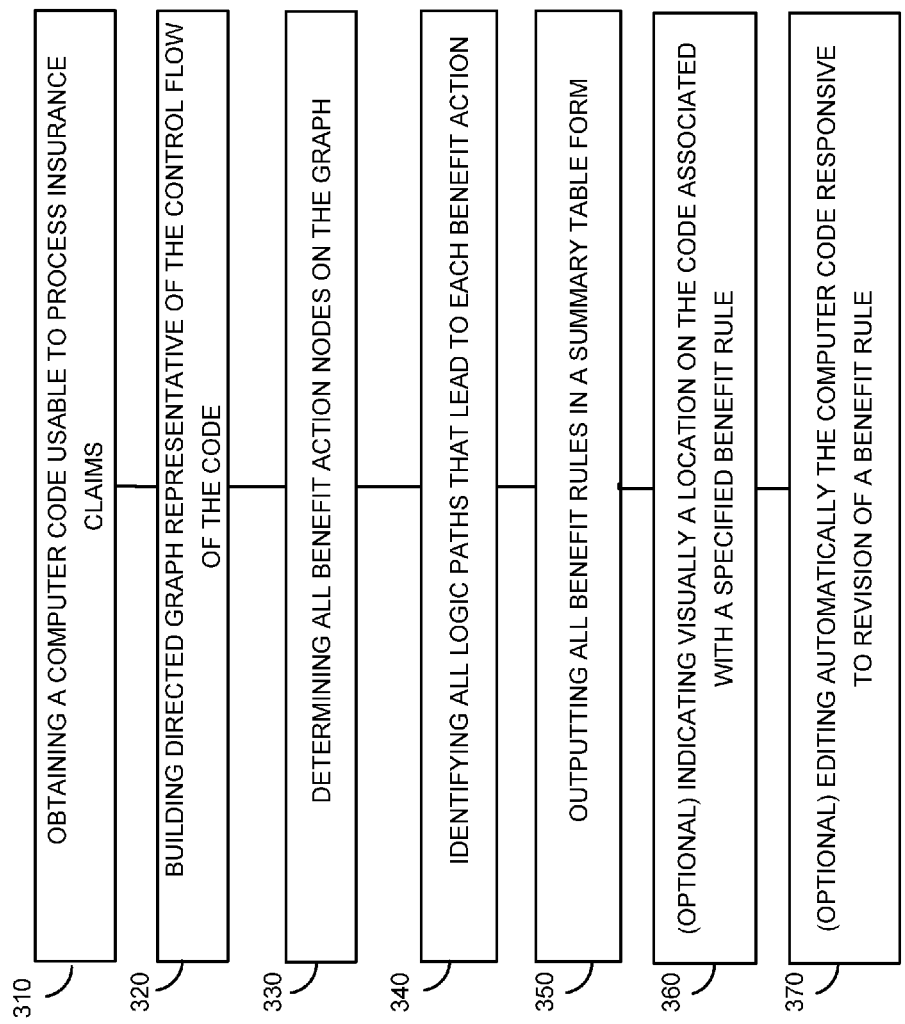
FIG. 3 is a high level flowchart diagram illustrating a method according to some embodiments of the invention.

FIG. 3 is a high level flowchart diagram illustrating a method according to some embodiments of the invention. The method includes: obtaining a computer code usable to process insurance claims 310; building a computer readable directed graph representing a control flow of the code, by identifying decisions and actions in the code, the graph comprising nodes connected by edges, some of the nodes being decision nodes associated with the decisions and some of the nodes being action nodes associated with the actions 320;

determining, on the graph, benefit action nodes that are each associated with at least one monetary outcome of a specified insurance claim 330; identifying all logic paths that lead to each benefit action node by traversing the graph from each benefit action node backwards, each logic path that includes a sequence of preceding decision nodes and action nodes connected by edges, each set of paths being associated with a specified benefit action node representing a benefit rule 340; and outputting all benefit rules by presenting each specified benefit action vis à vis grouped logic paths associated with the specified benefit action 350.

According to some embodiments of the invention, the presenting is performed such that each action and decision on each logic graph and each specified benefit action are presented in a specified natural language.

According to some embodiments of the invention, the computer code comprises commands, numeric codes, and conditions, the method further comprising converting the commands, the numeric codes, and the conditions into a specified natural language, and wherein the presenting being performed in view of the converting such that each action and decision on each logic graph and each specified benefit action are presented in the specified natural language.

According to some embodiments of the invention, the presenting is in a form of a summary table format usable by insurance claim processing personnel.

According to some embodiments of the invention, the presenting results in a human-readable domain specific representation of the control flow of the computer code grouping the benefit rules.

According to some embodiments of the invention, decision nodes of a specified logic path affect the monetary outcome of the benefit action node associated with the logic path.

According to some embodiments of the invention, the method further includes indicating visually at least one specified location on the code associated with a specified benefit rule, responsive to a query regarding the specified benefit rule 360.

According to some embodiments of the invention, the method further includes editing automatically the computer code responsive to a specified revision to a specified benefit rule by a user, wherein the editing being performed by converting the revision into a revised control flow, converting the revised control flow into a revised computer code portion, and replacing the computer code portion associated with the benefit rule before the revision with the revised computer code portion 370.

Figure 5:
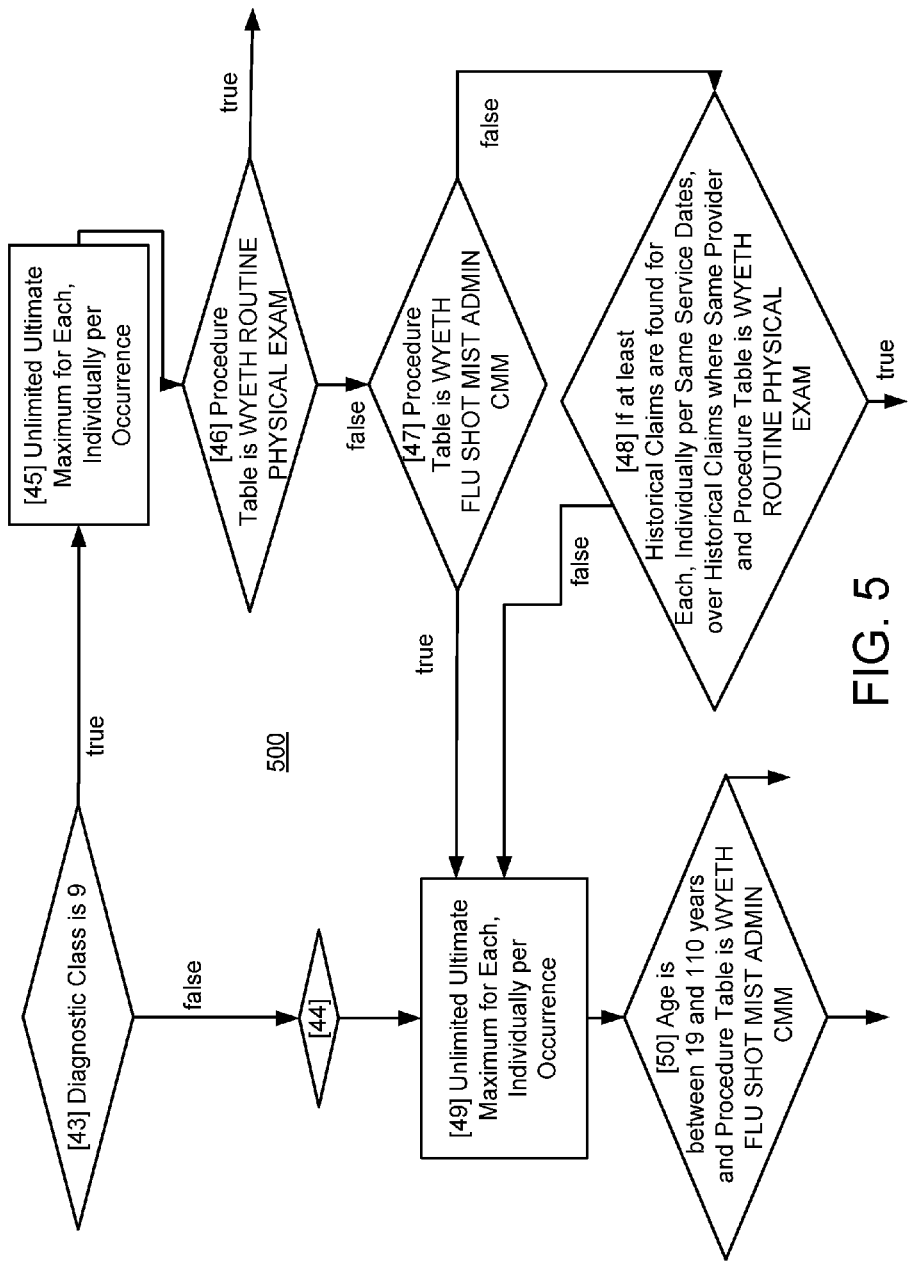
FIG. 5 is a graph diagram illustrating an aspect according to some embodiments of the invention.

FIG. 4 is an exemplary conversion table, FIG. 5 is an exemplary graph diagram, and FIG. 6 is an exemplary summary table diagram, all illustrating an aspect according to some embodiments of the invention.

Conversion table 400 is a data structure that enabled conversion of commands and expressions on the code column 410 into terms and expressions in a natural language (e.g., English) in the natural language column 420. Thus, for example, ECH 412 becomes 'each' 422, and UUL 414 becomes Unlimited Ultimate Maximum 424.

Graph 500 shows several decision nodes (e.g., 43, 44, 46, 47, and 48) as well as a benefit action node, 49. As shown, there are three different logic paths leading to benefit action node 49—via 44, via 47 and via 48. As further shown, some of the nodes are associated with the respective converted code expressions, for later grouping in the summary table. It is understood that the conversion may be performed after the building of the graph and not necessarily used prior to extracting of the various logic paths.

Summary table 600 presents all benefit rules 610-630 in conjunction with their respective sequence of decisions and actions 612, 614, 622, 624, and 632 as extracted from the alternative logic paths according to the code and further converted into natural language, so that it is presented in a human readable form.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
    obtaining a computer code comprising computer commands usable to process insurance claims;
    building a computer readable directed graph representing a control flow of the computer code, by identifying decisions and actions in the computer code, the graph comprising nodes connected by edges, some of the nodes being decision nodes associated with the decisions and some of the nodes being action nodes associated with the actions;
    determining, on the graph, benefit action nodes that are each associated with at least one monetary outcome of a specified insurance claim;
    identifying all logic paths that lead to each benefit action node by traversing the graph from each benefit action node backwards, each logic path comprising a sequence of preceding decision nodes and action nodes connected by edges, each set of paths being associated with a specified benefit action node representing a benefit rule;
    converting automatically code expressions from the computer code to create natural language benefit rules; and
    outputting the natural language benefit rules by presenting each specified benefit action in relation to grouped logic paths associated with the specified benefit action;
    editing automatically the computer code responsive to a specified revision to a specified benefit rule by a user, wherein the editing being performed by converting the revision into a revised control flow, converting the revised control flow into a revised computer code portion, and replacing the computer code portion associated with the benefit rule before the revision with the revised computer code portion;
    indicating visually at least one specified location on the computer code associated with a specified benefit rule, responsive to a query regarding the specified benefit rule;
    wherein at least one of: the obtaining, the building, the determining, the identifying, and the outputting and the editing is performed by at least one computer.

2. The method according to claim 1, wherein the presenting being performed such that each action and decision on each logic graph and each specified benefit action are presented in a specified natural language.

3. The method according to claim 1, wherein the computer code comprises commands, numeric codes, and conditions, the method further comprising converting the commands, the numeric codes, and the conditions into a specified natural language, and wherein the presenting being performed in view of the converting such that each action and decision on each logic graph and each specified benefit action are presented in the specified natural language.

4. The method according to claim 1, wherein the presenting being in a form of a summary table format usable by insurance claim processing personnel.

5. The method according to claim 1, wherein the presenting results in a human-readable domain specific representation of the control flow of the computer code grouping the benefit rules.

6. The method according to claim 1, wherein all decision nodes of a specified logic path affect the monetary outcome of the benefit action node associated with the logic path.

7. A system comprising:
    a processor;
    a computer-implemented backend module; and
    a computer-implemented graphical user interface module, wherein the backend module being configured to:
    obtain a computer code usable to process insurance claims;
    build a computer readable directed graph representing a control flow of the computer code, by identifying decisions and actions in the computer code, the graph comprising nodes connected by edges, some of the nodes being decision nodes associated with the decisions and some of the nodes being action nodes associated with the actions;
    determine, on the graph, benefit action nodes that are each associated with at least one monetary outcome of a specified insurance claim; and
    identify all logic paths that lead to each benefit action node by traversing the graph from each benefit action node backwards, each logic path comprising a sequence of preceding decision nodes and action nodes connected by edges, each set of paths being associated with a specified benefit action node representing a benefit rule,
    convert automatically code expressions from the computer code to create natural language benefit rules; and
    wherein the graphical user interface module being configured to output the natural language benefit rules by presenting each specified benefit action in relation to grouped logic paths associated with the specified benefit action;
    wherein the backend module being further configured to automatically edit the computer code responsive to a specified revision to a specified benefit rule entered by a user over the graphical user interface, wherein the backend module being configured to convert the revision into a revised control flow, convert the revised control flow into a revised computer code portion, and replace the computer code portion associated with the benefit rule before the revision with the revised computer code portion;
    wherein the graphical user interface module being further configured to visually indicate at least one specified location on the computer code associated with a specified benefit rule, responsive to a query regarding the specified benefit rule.

8. The system according to claim 7, wherein the graphical user interface being further configured to present the benefit rules such that each action and decision on each logic graph and each specified benefit action are presented in a specified natural language.

9. The system according to claim 7, wherein the computer code comprises commands, numeric codes, and conditions, wherein the backend module being further configured to convert the commands, the numeric codes, and the conditions into a specified natural language, and wherein the graphical user interface module being further configured to present the benefit rules in view of the converting such that each action and decision on each logic graph and each specified benefit action are presented in the specified natural language.

10. The system according to claim 7, wherein the graphical user interface module being further configured to present all the benefit rules in a summary table format usable by insurance claim processing personnel.

11. The system according to claim 7, wherein the graphical user interface module being further configured to present a human-readable domain specific representation of the control flow of the computer code grouping the benefit rules.

12. The system according to claim 7, wherein all decision nodes of a specified logic path affect the monetary outcome of the benefit action node associated with the logic path.

13. A computer program product, the computer program product comprising:
- a non-transitory computer readable storage medium having computer readable program embodied therewith, the computer readable program comprising:
- computer readable program configured to obtain a computer code usable to process insurance claims;
- computer readable program configured to build a computer readable directed graph representing a control flow of the computer code, by identifying decisions and actions in the computer code, the graph comprising nodes connected by edges, some of the nodes being decision nodes associated with the decisions and some of the nodes being action nodes associated with the actions;
- computer readable program configured to determine, on the graph, benefit action nodes that are each associated with at least one monetary outcome of a specified insurance claim;
- computer readable program configured to identify all logic paths that lead to each benefit action node by traversing the graph from each benefit action node backwards, each logic path comprising a sequence of preceding decision nodes and action nodes connected by edges, each set of paths being associated with a specified benefit action node representing a benefit rule;
- computer readable program configured to convert automatically code expressions from the computer code to create natural language benefit rules;
- computer readable program configured to output the natural language benefit rules by presenting each specified benefit action in relation to grouped logic paths associated with the specified benefit action;
- computer readable program configured to edit automatically the computer code responsive to a specified revision to a specified benefit rule by a user, wherein the edit is performed by converting the revision into a revised control flow, converting the revised control flow into a revised computer code portion and replacing the computer code portion associated with the benefit rule before the revision with the revised computer code portion; and
- computer readable program configured to indicate visually at least one specified location on the computer code associated with a specified benefit rule, responsive to a query regarding the specified benefit rule.

14. The computer program product according to claim 13, wherein the computer readable program being configured to output all benefit rules is further configured such that each action and decision on each logic graph and each specified benefit action are presented in a specified natural language.

15. The computer program product according to claim 13, wherein the computer comprises commands, numeric codes, and conditions, the method further comprising converting the commands, the numeric codes, and the conditions into a specified natural language, and wherein the presenting is performed in view of the converting such that each action and decision on each logic graph and each specified benefit action are presented in the specified natural language.

16. The computer program product according to claim 13, wherein the computer readable program being configured to output all benefit rules produces a summary table in a format usable by insurance claim processing personnel.

17. The computer program product according to claim 13, wherein the computer readable program being configured to output all benefit rules produces a human-readable domain specific representation of the control flow of the computer code grouping the benefit rules.

18. The computer program product according to claim 13, wherein all decision nodes of a specified logic path affect the monetary outcome of the benefit action node associated with the logic path.

\* \* \* \* \*